United States Patent
Simske et al.

(10) Patent No.: US 9,087,252 B2
(45) Date of Patent: Jul. 21, 2015

(54) GRAYSCALE INCREMENTAL INFORMATION OBJECT

(75) Inventors: Steven J. Simske, Fort Collins, CO (US); Marie Vans, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/885,987

(22) PCT Filed: Apr. 20, 2011

(86) PCT No.: PCT/US2011/033212
§ 371 (c)(1),
(2), (4) Date: May 16, 2013

(87) PCT Pub. No.: WO2012/144994
PCT Pub. Date: Oct. 26, 2012

(65) Prior Publication Data
US 2014/0027515 A1    Jan. 30, 2014

(51) Int. Cl.
*G06K 7/14* (2006.01)
*G06K 19/06* (2006.01)
*G06Q 50/00* (2012.01)

(52) U.S. Cl.
CPC ........ *G06K 7/1408* (2013.01); *G06K 19/06009* (2013.01); *G06K 19/06037* (2013.01); *G06K 19/06046* (2013.01); *G06Q 50/00* (2013.01)

(58) Field of Classification Search
CPC .. B01F 13/0059; B01F 5/0646; B01F 5/0647; B01L 2300/0874; G06K 19/00; G06K 7/1408; G06K 19/06046; G06K 19/06037; G06K 19/06009; G06Q 50/00
USPC ........... 235/454; 358/3.13; 430/320; 137/833
See application file for complete search history.

(56) References Cited

U.S. PATENT DOCUMENTS

| | | | |
|---|---|---|---|
| 7,185,816 B1 | 3/2007 | Shoobridge | |
| 7,229,025 B2 | 6/2007 | Sussmeier et al. | |
| 7,246,748 B1 * | 7/2007 | Feuerman et al. | 235/462.09 |
| 7,712,671 B2 | 5/2010 | Cattrone et al. | |
| 2005/0269416 A1 * | 12/2005 | Sussmeier et al. | 235/494 |
| 2007/0278303 A1 | 12/2007 | Cattrone | |
| 2007/0278313 A1 | 12/2007 | Jones et al. | |
| 2009/0250512 A1 | 10/2009 | Deck et al. | |
| 2010/0155479 A1 | 6/2010 | Ming | |

OTHER PUBLICATIONS

Xiaodan, Liu et al, "A Novel Encoding Method for Visual two-dimensional Barcode Using Pattern Substitution", Pub Date Apr. 24-25, 2010.

* cited by examiner

*Primary Examiner* — Sonji Johnson
(74) *Attorney, Agent, or Firm* — Int'l IP Law; Nathan E Stacy (57) ABSTRACT

Systems and methods for generating a grayscale incremental information object (IIO) are provided. A method includes analyzing a grayscale IIO to determine a first code, wherein the grayscale IIO comprises a plurality of tiles, and the intensity of a tile corresponds to the number of data bits written to the tile. The product is confirmed from the first code, and, if the product is confirmed a new code comprising a bitstream is generated. The bitstream is overwritten on the grayscale IIO. The grayscale IIO is the same size after writing of the bitstream.

14 Claims, 7 Drawing Sheets

GRAYSCALE INCREMENTAL INFORMATION OBJECT

BACKGROUND

Products are information-containing items, such as documents, labels, books, software, images, and the like, which can exist in both physical and electronic forms. During the lifecycle of a product, it may move between physical and electronic forms several times as it progresses through a workflow. As used herein, a workflow is a defined set of stages, usually with task at each stage, which a product must pass through during its lifecycle. For example, a document may be drafted by a first person, then flow through a number of different editors, prior to being issued to customers or clients in final form. As another example, a manufacturer may package a product for sale to another manufacturer, such as a bundled software package to be sold with a computer.

A bar code may be associated with a product, for example, to protect from counterfeiting and other falsifications. The same bar code may be used throughout the workflow to identify the product. However, this approach does not enable the status of the workflow to be monitored via the bar code. Multiple bar codes may be added, for example, by each entity within a workflow. This may be used to identify the product as it moves from one stage to the next in its workflow, for example, by confirming the identity of the last party to handle the product. However, the use of multiple bar codes may take a substantial amount of space.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components.

DETAILED DESCRIPTION

Embodiments discussed herein may be used to generate a grayscale incremental information object (IIO), for example, a feature or mark carrying information that may be useful for tracing, tracking, state indication, data embedding, authentication, identification, or any other operations that may be used to provide information as a product progresses through a workflow. As used herein, all of these operations are encompassed by the general term "confirming." For example, confirming may include determining that the information in a grayscale IIO is consistent with information that should have been added at an earlier stage of a workflow. The grayscale IIO can maintain a size, a shape, or both, as the item moves through an associated workflow, even though additional information may be added to the grayscale IIO at each stage of the workflow. The grayscale IIO may be designed taking into account security needs, the type of readers available, and other concerns, such as branding, fraud prevention, robustness to damage, and the like.

As mentioned above, a workflow is a defined set of stages, usually with one or more tasks at each stage, through which a product may pass during its lifecycle. In an embodiment, the workflow is a process during which documents, information, tasks, or products are passed from one participant to another for action or informative purposes, according to a set of procedural rules.

Workflows may include any number of actions for processing the product. For example, a workflow for an image may include actions such as quality assurance, authentication, forensics, and the like. A supply chain workflow may include actions such as tracking, tracing, inspection, shipping, receiving, recall, among others. Workflows may also include other workflows. For example, a manufacturing workflow may include environmental workflows, sensor data monitoring workflows, compliance workflows, auditing workflows, and statistical workflows, such as inventory, average time at a node, and the like. Thus, a workflow may be defined as a set of tasks associated with generating, implementing, producing, or distributing a product.

A current stage of a workflow may be referred to as "node," For example, if a document moves from a creator to an editor, and then on to a subscriber, the respective nodes may include creation, editing, and receiving. At any stage in the workflow, the node corresponds with a current version, whether physical or electronic, of a product. Nodes may also be in parallel, for example, when multiple recipients need to review a document. Each of the nodes may have an associated system for, among other tasks, decoding, confirming, and writing IIOs.

A grayscale IIO may be a glyph or mark that can be incrementally over-written throughout the workflow to form an identifying object having increasing data content at each stage. For example, the grayscale IIO may be a three dimensional (3D) grayscale barcode, in which a field of tiles in a two dimensional matrix encode information and a grayscale state is used to encode a third dimension at each tile.

Each state of the tiles may be readily distinguished from each other state. As discussed below, the states may include a number of grayscale intensities, from completely white to completely black. The tiles may include square shaped tiles, rectangular shaped tiles, triangle shaped tiles, rounded tiles, mixed shaped tiles, mixed sized tiles, non-uniformly shaped tiles, or combinations thereof. Each state of the grayscale IIO is determined by the set of tiles that have been written to at a given stage of the workflow.

The grayscale IIO may be a physical mark on a product, such as a printed document or a label on a package. Further, the IIO may be an electronic object in a document, for example, which is displayed as a mark on a viewing device. In this embodiment, the IIO may be printed with the product, for example, appearing as a mark on a first page of a document.

The grayscale IIO may be read from either the physical object or from the viewing device using a specialized hand-held or mobile device, such as a bar code reader. In some embodiments, a virtual bar code reader may be used to read the grayscale IIO from an electronic document, without using a physical device. In some embodiments, a software object may locate and extract the image from an electronic document. As used herein, the term "bar code reader" includes all of these devices or techniques.

Figure 1:
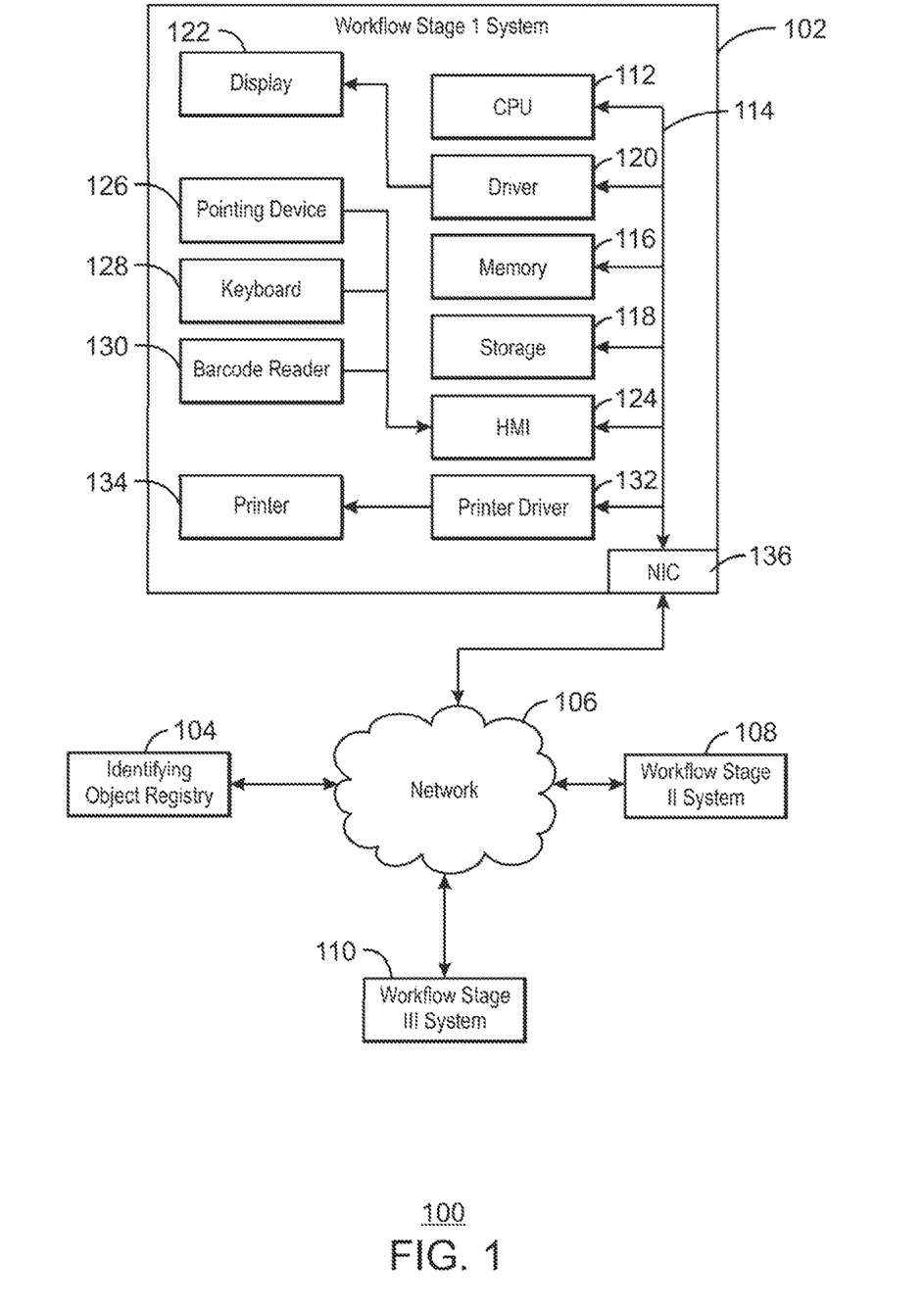
FIG. 1 is a schematic diagram of a system for using a grayscale incremental information object (IIO) through a workflow in accordance with an embodiment.

FIG. 1 is a schematic diagram of a system 100 for using a grayscale IIO through a workflow in accordance with an embodiment. The workflow may start at a first stage system 102. Any number of systems for stages in the workflow may be included, depending on the workflow.

The first stage system 102 may access an identifying object registry 104, for example, over a network 106, to obtain an initial code for the grayscale IIO. The network 106 may be a local area network (LAN), a wide area network (WAN), or the Internet, and may include both public and private network segments, such as virtual private networks (VPN). Other information may also be provided, such as a stream of bits that may be used to set initial entropy in the grayscale IIO, as discussed in further detail below.

The first stage system 102 can be used to create the grayscale IIO, for example, by writing the entropy bits to the grayscale IIO, followed by writing a bitstream generated from the initial code provided by the identifying object registry 104. As discussed herein, entropy bits are bits set in an IIO to provide an initial complexity, or entropy, that may make the code written onto the IIO harder to guess. The bitstream may be generated using any number of techniques. In an embodiment, a private key associated with the first stage of the workflow may be used to encrypt the initial code provided by the identifying object registry 104. A public key could then be provided to subsequent workflow stages. Any number of other techniques to generate the bitstream may be used in various embodiments. In an embodiment, the initial code provided by the identifying object registry 104 may used as the bitstream and may be directly written to the IIO, for example, if all confirmation is performed against the identifying object registry 104.

Other stages of the workflow may have associated systems, such as the stage two system 108 and the stage three system 110 illustrated in FIG. 1. The first stage system 102 may be used to either coordinate the physical transfer of a product to the second stage system 108 or to directly transfer a product in electronic form. Similarly, the stage two system 108 may transfer or coordinate the transfer of the product to the stage three system 110. At each stage, information may be sent to the next stage's system to confirm the grayscale IIO. Alternately, the system at each stage may confirm the grayscale IIO by communicating with the identifying object registry 104.

Any of the stage systems 102, 108, and 110, or the identifying object registry 104, may include units to provide the functionality used to generate the grayscale IIO, as shown for the first stage system 102. These units may include a central processing unit (CPU) 112. The CPU 112 may include a single core processor, a multi-core processor, or a cluster of processors, for example, in a cloud computing configuration. The CPU 112 may communicate with other units over a bus 114, which can include a PCI bus, a PCIe bus, an optical bus, or any other suitable type of bus.

A memory 116, such as random access memory (RAM) or read-only memory (ROM), may be used to store operating programs and data configured to implement the methods described herein. As used herein, programs include machine readable code configured to direct a processor to implement various functions. Similarly, a storage system 118 may provide longer term storage for data and programs. The storage system 118 may include, for example, a hard drive, an optical drive, a flash drive, a memory drive, and the like. The memory 116 and storage system 118 can provide a non-transitory, computer readable medium for storing programs and data to implement the techniques described herein, as discussed further with respect to FIG. 10.

Other units may also be included to provide further functionality. For example, the stage systems may include a display driver 120 to drive a display 122, for example, to display the product and the grayscale IIO. A human-machine interface (HMI) 124 can be used to interface with a number of input devices, including, for example, a pointing device 126, such as a mouse or touchscreen, among others, a keyboard 128, and a barcode reader 130. A printer driver 132 may be used to interface with a printer 134 to print the grayscale IIO, the product, or both. The printer 134 may be a general purpose unit, such as a laser printer or an ink jet printer, or may be a dedicated unit configured to overprint a grayscale IIO with additional information. In addition, a network interface card (NIC) 136 may be provided to permit the stage systems to access the network, the NIC 136 may include a wired Ethernet interface, a wireless network interface, or a mobile network interface.

A number of possible workflow patterns may be implemented on the system 100 discussed above. For example, the workflow may follow the patterns discussed with respect to FIGS. 2 and 3.

Figure 2:
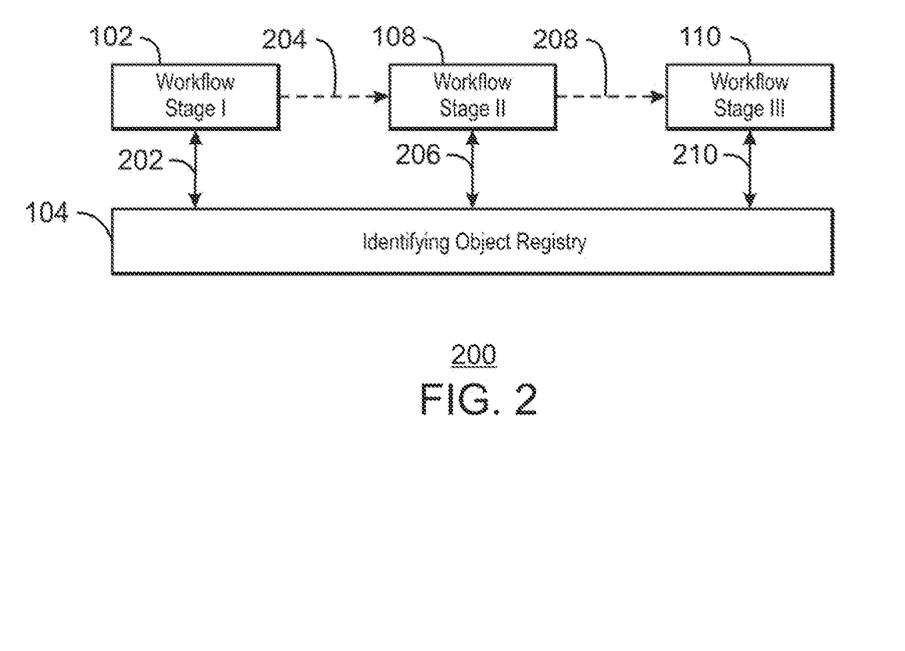
FIG. 2 is block diagram of a workflow using a centralized identifying object registry for confirmation of a product in accordance with an embodiment.

FIG. 2 is block diagram of a workflow using a centralized identifying object registry for confirmation of a product in accordance with an embodiment. If the registry-based workflow 200 is utilized, a first stage system 102 exchanges the information to generate the grayscale IIO with the identifying object registry 104, as indicated by arrow 202. The information 202 may include the rules for generating the grayscale IIO, any bits used for adding complexity (e.g., entropy) to the initial grayscale IIO, and the like. As discussed in more detail below, entropy is added to an IIO by writing an initial number of bits to make it more complex. This may make guessing the code in an IIO more difficult. In an embodiment, the information 202 may be the total information needed to write the grayscale IIO if, for example, the identifying object registry 104 were to retain all coding information.

At the next stage in the workflow, the second stage system 108 receives a package 204 of information from the first stage system 102. The information 202 may include the document and its associated grayscale IIO. In the case of a physical product, the package 204 may be physically transferred from one stage to the next in the workflow. The second stage system 108 may then confirm the grayscale IIO, for example, by decoding the image to form a bitstream and then exchanging information 206, including the bitstream, with the identifying object registry 104 for confirmation of the information 206. The information 206 returned from the identifying object registry 104 may include information confirming the grayscale IIO and information for generating a grayscale IIO for the next stage of the workflow. In an embodiment, the information 206 from the identifying object registry 104 may include all of the information used to directly complete the grayscale IIO.

To advance the workflow, the second stage system 108 sends a package 208 of information on to the third stage system 110. The third stage system 110 can then confirm the grayscale IIO by decoding the image to form a bitstream, and exchanging information 210 with the identifying object registry 104 for confirmation of the grayscale IIO. The techniques are not limited to only three workflow stages, but may include any number of workflow stages, both in series and in parallel. In the embodiment shown in FIG. 2, the addition to the grayscale IIO at each stage in the workflow 200 can be performed in conjunction with the identifying object registry 104. However, an independent incremental workflow may be utilized, without backward visibility in the workflow stage-stage transmission, as discussed further with respect to FIG. 3.

Figure 3:
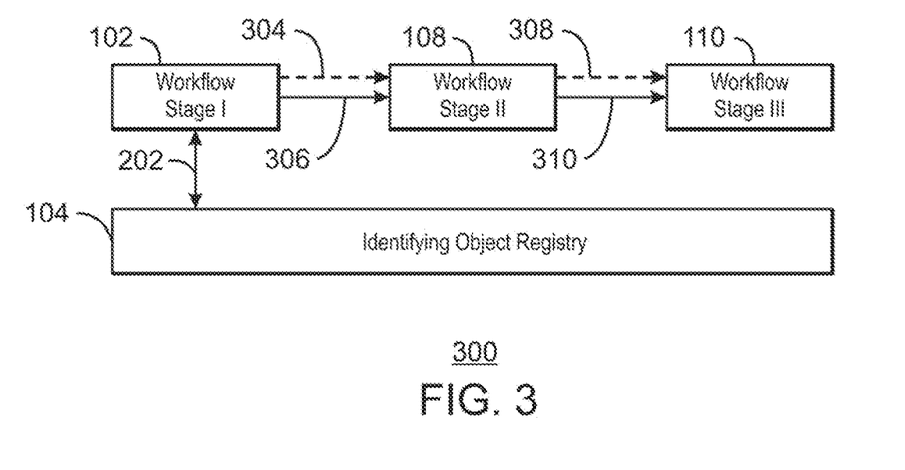
FIG. 3 is block diagram of a workflow that obtains an initial code from an identifying object registry, and uses the systems at each stage of the workflow for confirmation of the product in accordance with an embodiment.

FIG. 3 is block diagram of a workflow 300 that obtains an initial code from the identifying object registry 104, and uses the systems at each stage of the workflow to confirm the product in accordance with an embodiment. In this embodiment, the first stage system 102 exchanges information 302 with the identifying object registry 104 to create the grayscale IIO. As described with respect to FIG. 2, the information 302 may include the rules for generating the grayscale IIO, any bits used for adding entropy to the initial grayscale IIO and the like. In addition, the information 302 may include rules for creating grayscale IIOs at each stage of the workflow 300. In some embodiments, for example, these rules may include creating a hash code of the bitstream decoded from the current object, using a private key to encrypt the hash code, writing a bitstream of the hash code over the current grayscale IIO, and sending the hash code on to the next work stage along with a public key for decryption. Other information may also be included, such as an encrypted version of the starting point.

The grayscale IIO at each stage of the workflow can be deduced when the starting point is known, as most workflows have a small and well-defined set of nodes. Workflow exceptions may occur, however, when extra steps have been added, for example, in a non-legitimate progression. Similarly, exceptions may occur when available space for over writing successive codes becomes sparse during the workflow. In such instances, the stage of the workflow may not be deduced, and the grayscale IIO may fail the confirmation process. Any number of other techniques may be used to create a grayscale IIO at each stage of the workflow 300.

At the next stage, the stage two system 108 receives the product 304 and the information 306 that may be used to confirm the grayscale IIO on the product. For example, the information 306 may include an intelligent hash of the previous state of the grayscale IIO from the first stage system 102, among other items. In this embodiment, the stage systems may not have access to the identifying object registry 104, and the addition to the grayscale IIO at each stage in the workflow will be performed in conjunction with initial instructions received from the identifying object registry 104. This embodiment may be useful, for example, when the distribution network organization is proprietary.

After the work at stage two is completed, the stage two system 108 may forward the product 308 including the grayscale IIO, to the stage three system 110, along with the information 310 needed to confirm that earlier added information is correct.

As described herein, the identifying object registry 104 can include hardware, such as processors, memory, and storage. Further, the identifying object registry 104 and each of the workflow stage systems 102, 108, and 110, may include software for generating an incrementally completed grayscale IIO. Access to the identifying object registry 104 may be secure, for example, requiring a login and password or other authorization methods, such as biometric validation of identity, possession of a secure token, and the like. In an embodiment, the identifying object registry 104 may be unsecure, e.g., being publicly accessible.

In some embodiments, the system 100 may be set up as a cloud computing network, which may be a virtualized bank of computers including servers that enable Internet-based computing. Shared resources, software, and information may be provided to various computing devices through the cloud network. The computing devices may include the workflow stage systems 102, 108, or 110, which may be stationary, such as desktop computers, or mobile, such as laptop computers, netbooks, cellular phones, personal digital assistants (PDAs), and the like. The cloud computing network may allow a registry system provider to deliver access to the identifying object registry 104 and its various services to subscribers online via another web service or software, such as a web browser. Software and data associated with the cloud computing network may be stored on servers and their associated memory.

Thus, as a result of the workflow described above, the grayscale IIO contains an incrementally increasing amount of information at each stage of the workflow. This is discussed with respect to FIG. 4.

Figure 4:
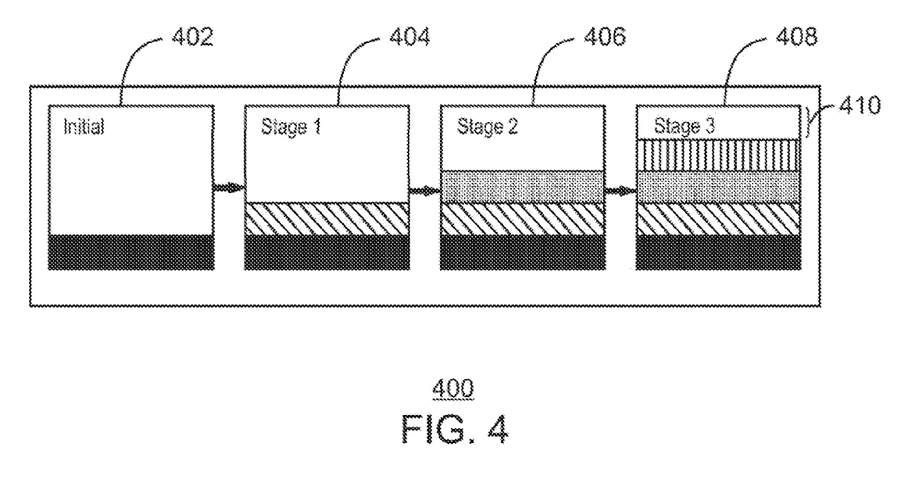
FIG. 4 is a schematic of information content in an IIO at different stages of a workflow, in accordance with an embodiment.

FIG. 4 is a schematic 400 of information content in an IIO at different stages of a workflow, in accordance with an embodiment. The grayscale IIO can have an initial number of bits set to provide entropy, making it less probable that the code may be guessed. These entropy bits provide a first amount 402 of information in the grayscale object. At the completion of the first stage of the workflow at block 404, the grayscale IIO is overwritten and contains a second and increased amount of information, which is transferred to the second stage of the workflow. After completion of the second stage of the workflow, at block 406, the grayscale IIO has a third and further increased amount of information. At block 408, the third stage of the workflow is completed, and the grayscale IIO contains a fourth amount of information. A portion 410 of the bits that may be written are left blank, providing entropy for the final grayscale IIO. To see the advantages provided by a three-dimensional grayscale IIO, it is useful to examine a simple two-dimensional IIO, as discussed with respect to FIG. 5.

Two-Dimensional (2D) IIOs

Figure 5:
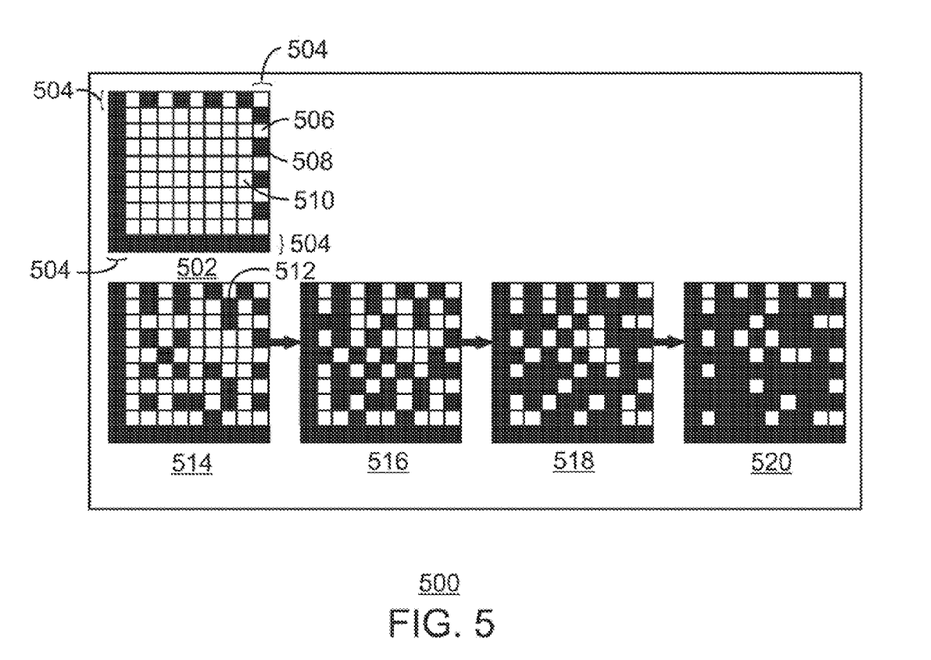
FIG. 5 is an schematic showing an example of changes to tiles that may occur in a two-dimensional IIO at each stage in a workflow.

FIG. 5 is a schematic 500 showing an example of changes to tiles that may occur in a two-dimensional (2D) IIO at each stage in a workflow. A blank IIO 502 shows the presence of non-payload indicia (NPI), which can be used to convey basic identification and calibration information, including, for example, the type of IIO being used, the number of gray values that may be present, an arrangement for the gray values, and the like. In this example, the NPI include the perimeter tiles 504 on all four sides of the 2D IIO. The alternating light tiles 506 and dark tiles 508 along two edges of the perimeter, and the dark tiles placed along the other two sides, provide calibration marks for adjustment of the image, as described herein. The blank tiles 510 inside the 2D IIO are the payload tiles which can be, for example, changed from light to dark to indicate the presence of a bit value of one.

A number of entropy bits 512, for example, sixteen in this illustration, may be set to a value of one within the blank 2D IIO 502 to create an initial 2D IIO 514. The entropy bits 512 increase the complexity of the initial 2D IIO 514, making it less probable that a code may be guessed. The initial 2D IIO 514 is passed to the first stage of the workflow, which writes the first bitstream over the initial 2D IIO 512, providing a first stage 2D IIO 516.

The writing may be performed by any number of schemes. For example, the writing may be performed by initializing both a tile counter and a bit pointer to zero. The value of the first bit in the stream is compared to the value of the first tile. If the first tile is light (zero) and the first bit is one, the value of the first tile is changed to dark (one), and both counters are incremented. If the first tile is dark (one), and the first bit is one, the tile counter is incremented until a light tile is reached, at which point the value of the tile is changed to dark (one). At that point, both counters are incremented. If the first bit is zero, the tile counter and the bit counter are both incremented without changes to tiles. The process is repeated until all of the bitstream is used. If the tiles are completely examined, i.e., the tile counter exceeds the number of tiles, the tile counter is reset to zero, and the process continues until all bits are written.

The first stage 2D IIO 516 is then passed to a second stage of a workflow with the product. At the second stage of the workflow, the first stage 2D IIO 516 may be confirmed and then used in the creation of a second stage 2D IIO 518, for example, by writing a bitstream over the first stage 2D IIO 516. The process is repeated at the third stage resulting in the third stage 2D IIO 520.

A 2D IIO using light to dark binary transitions may provide a large number of state transitions, making the probability of decoding or falsification very low. For example, the statistical probability associated with a stage i in the workflow may be defined as $P_i$. Thus, the number of residual (0 bits) at the end of the workflow is $N_{RB}$, and the number of initial unwritten bits is $N_{IU}$. The values of $N_{RB}$ and $N_{IU}$ used to achieve a particular value for $P_i$ are governed by the formula of Eqn. 1.

$$\frac{N_{IU}!}{(N_{IU} - N_{RB})!N_{RB}!} \geq \prod_i P_i \qquad \text{Eqn. 1}$$

In Eqn. 1, the exclamation mark (!) represents the factorial operator. $P_i$ may be determined from, for example, the required statistical confidence that a next step cannot be randomly guessed multiplied by the total number of IIOs of the current state that will be readable in the supply chain. If the IIO is unique at step i−1, then the total number of IIOs of the current state is 1.

As an example, consider a case in which a 2D IIO is initially 25% filled with black tiles and upon completion of its workflow it is 75% filled with black tiles. For purposes of this example, it can be assumed that there are six stages in the workflow: a manufacturer, four distributors, and an end retailer. Further, for the purposes of the supply chain, it can be assumed that the desired statistical $P_i$ values are $10^9$ for manufacturer and the four distributors and $10^3$ for the retailer. Thus, the $$\prod_i P_i$$

value is about $10^{48}$.

Suppose a number of bits in each of a number of bitstreams are represented by {g,h,i,j,k,l}, wherein each of the bitstreams are used to move the product through a particular stage of the workflow. The final number of bits, $N_{RB}$, is assumed to be ⅓ of the original unwritten bits, $N_{IU}$. Accordingly, the governing equations for each step in this workflow are:

$$\frac{N_{IU}!}{g!(N_{IU} - g)!} \geq 10^9 \qquad \text{Eqn. 2}$$

$$\frac{(N_{IU} - g)!}{h!(N_{IU} - g - h)!} \geq 10^9 \qquad \text{Eqn. 3}$$

$$\frac{(N_{IU} - g - h)!}{i!(N_{IU} - g - h - i)!} \geq 10^9 \qquad \text{Eqn. 4}$$

$$\frac{(N_{IU} - g - h - i)!}{j!(N_{IU} - g - h - i - j)!} \geq 10^9 \qquad \text{Eqn. 5}$$

$$\frac{(N_{IU} - g - h - i - j)!}{k!(N_{IU} - g - h - i - j - k)!} \geq 10^9 \qquad \text{Eqn. 6}$$

$$\frac{(N_{IU} - g - h - i - j - k)!}{l!(N_{IU} - g - h - i - j - k - l)!} \geq 10^3 \qquad \text{Eqn. 7}$$

Note that $(N_{IU}-g-h-i-j-k-l)!$ in Eqn. 7 is the same as $N_{RB}!$, and so simplifying Equations 2-7 together gives Eqn. 8.

$$\frac{N_{IU}!}{g!h!i!j!k!l!N_{RB}!} \geq 10^{48} \qquad \text{Eqn. 8}$$

Eqn. 8 is in similar form to Eqn. 1. With Eqn. 8, we can compute the overall number of bits required in the 2D barcode (and by extension at each step in the workflow).

Assuming g!=h!=i!=k!, the equation simplifies to:

$$\frac{N_{IU}!}{(g!)^5 l! N_{RB}!} \geq 10^{48} \qquad \text{Eqn. 9}$$

Even with governing Eqns. (2)-(9), there are still a large set of solutions to this problem. It can be assumed that g≤h≤i≤j≤k, since they represent the number of open bits to achieve a given number of bits at a particular stage. Further, k>>l in this particular example. However, it can be determined from above that with N payload elements (bits), there are $2^N$ different states of the overall payload, and, so, the minimum number for N is such that $2^N \geq 10^{48}$ or more and, thus, N≥160. Because barcodes are generally represented as N×N where N is an even number, we choose, for this example, N=14, in other words, giving a the area of 14×14 for the information payload, i.e., not including tiles used for NPI. This provides $2^{192}$=6.277×$10^{57}$ states, which is sufficient to accommodate the state changes {g,h,i,j,k} above, but not enough to accommodate the initial fill and final fill tiles, for example, used for the entropy bits. Thus, a 2D security code may be selected with a 16×16 matrix of 256 tiles. In this state, 32 tiles may be filled as the starting condition and 224 filled as the final fill. This means there are 192 bits to fill in between, with an additional statistical advantage of having 224 to choose from on the first step {g}.

To match the desired probabilities, the steps {g,h,i,j,k} may be given 36 bits each, with {l} as 12 as an initial guess for the last step. Thus, for the last step, {l}, 44 remaining open tiles can move to 32 open tiles, and so the governing statistics are 44!/12!32!=2.1×$10^{10}$, which is well above the required $10^3$. For {k}, the governing statistics are 80!/36!44!=7.2×$10^{22}$, well above the required $10^9$. For $\{g,h,i,j\}$, the statistics are even better—for $\{j\}$ it is $116!/36!80!=1.27\times10^{30}$, for $\{i\}$ it is $1.0\times10^{35}$, for $\{h\}$ it is $5.5\times10^{38}$, and for $\{g\}$ it is $5.5\times10^{41}$. This demonstrates that the number of state transitions is much higher than the number of states. In this case, Eqn. 10 applies.

$$\frac{N_{IU}!}{(g!)^5 l! N_{RB}!} = 6.23\times10^{178} \qquad \text{Eqn. 10}$$

A smaller 2D IIO may also be used. For example, if the 2D IIO is limited to a 12×12 matrix of payload tiles, $N_{IU}$ may be selected as 136, so there are $3.76\times10^{12}$ initial states using 8 bits to define the initial state, and $2.09\times10^{13}$ final states using 16 bits to define the final state. The remaining 120 bits for $\{g,h,i,j,k,l\}$ use $\{22,22,22,22,22,10\}$ bits each providing $1.28\times10^{25}$, $1.8\times10^{23}$, $9.2\times10^{20}$, $8.6\times10^{17}$, $2.74\times10^{13}$ and $5.1\times10^{6}$ state transitions, respectively. So, here, for this smaller 2D IIO Eqn. 11 applies.

$$\frac{N_{IU}!}{(g!)^5 l! N_{RB}!} = 2.69\times10^{107} \qquad \text{Eqn. 11}$$

Another way to obtain a smaller IIO is to encode multiple bits into each tile. In an embodiment, this is performed by using multiple levels of darkness to represent levels in a single tile, increasing the number of bits each tile represents. This is further discussed with respect to FIG. 6.

Figure 6:
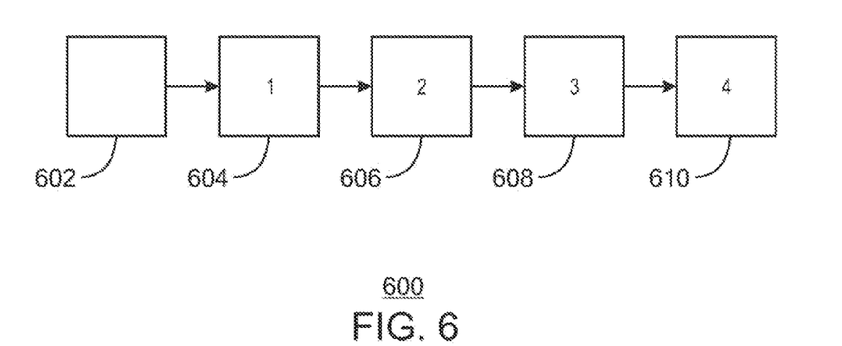
FIG. 6 is a schematic illustrating the use of a multi-level grayscale to increase the information content of a single tile, in accordance with an embodiment.

FIG. 6 is a schematic 600 illustrating the use of a multi-level grayscale to increase the information content of a single tile 602, in accordance with an embodiment. In this example, each time a bit value of one is written to the tile, the intensity may be increased by 25%, for example, going from white to 25% gray at the first bit, as indicated by the second the 604. Another bit value of one may increment the intensity to 50% gray for the second bit in a third tile 606, to 75% gray for the third bit in a third tile 608, to 100% gray, i.e., black, for the fourth bit in a fourth tile 610. For example, using four intensity increases, from white to dark, representing an incremental increase of one bit per tile as each intensity level is increased over the previous intensity level.

The use of the grayscale changes the IIO to a three dimensional IIO. It can be noted that the grayscale values are not limited to 4 intensity levels, as any number of intensity levels may be used, so long as they can be clearly distinguished. The use of four intensity levels in addition to a white base level increases the information density of the grayscale IIO by 2.3 in comparison to the 2D IIO discussed with respect to FIG. 5.

Figure 7:
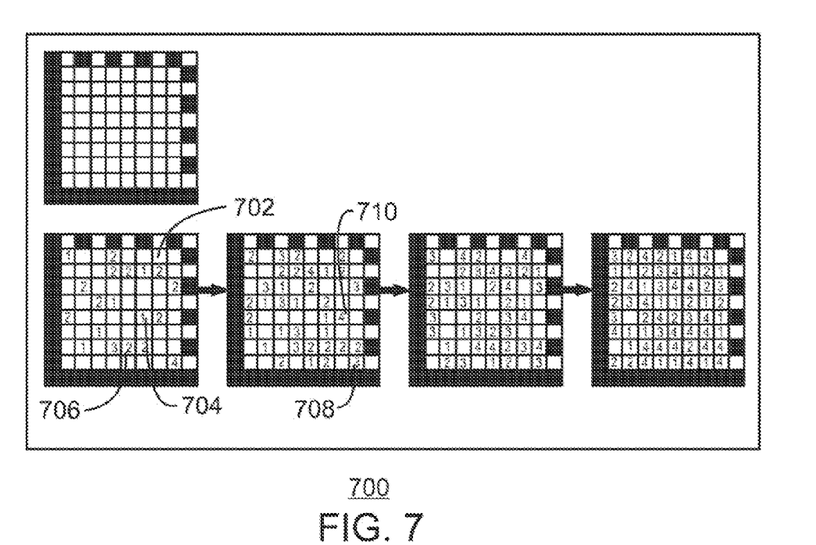
FIG. 7 is a schematic showing an example of changes to tiles that may be seen in combining the two-dimensional IIO, as shown in FIG. 6, with a multi-level grayscale for each tile, as shown in FIG. 7, in accordance with an embodiment.

FIG. 7 is a schematic 700 showing an example of changes to tiles that may be seen in combining the two-dimensional IIO, as shown in FIG. 5, with a multi-level grayscale for each tile, as shown in FIG. 6, in accordance with an embodiment. Throughout FIGS. 7 and 8, tiles with no number 702 are white tiles, tiles bearing a "1" 704 are at 25% intensity, tiles bearing a "2" 706 are at 50% intensity, tiles bearing a "3" 708 are at 75% intensity, and tiles bearing a "4" 710 are at 100% intensity, i.e., are black. The numbers also correspond to the number of bits, having a bit value of one, which have been written to a tile.

The non-binary tiles in the grayscale IIOs can be unzipped to be a binary string. For example, a grayscale IIO which includes tiles that can be one of five states can be unzipped initially to a bit string length that is about 2.3 times that of a binary identifying object. Thus, in general, N possible states for a single tile may store $\text{Log}(N)/\text{Log}(2)$ bits in that tile.

As described herein, a Hamming distance is the sum of bits that are different from one stage to the next. In an embodiment, the Hamming distance between successive stages is fixed. Since multiple-intensity level transitions in a single tile at a given stage may be allowed the possible state-state transitions in a grayscale IIO of a given size is increased. These embodiments afford a known Hamming distance between workflow stages because the Hamming distance used herein is defined in a non-binary, modified fashion. Any suitable modified Hamming distance between the workflow stages may be selected in order to accommodate the desired number of bits to be encoded per stage.

Figure 8:
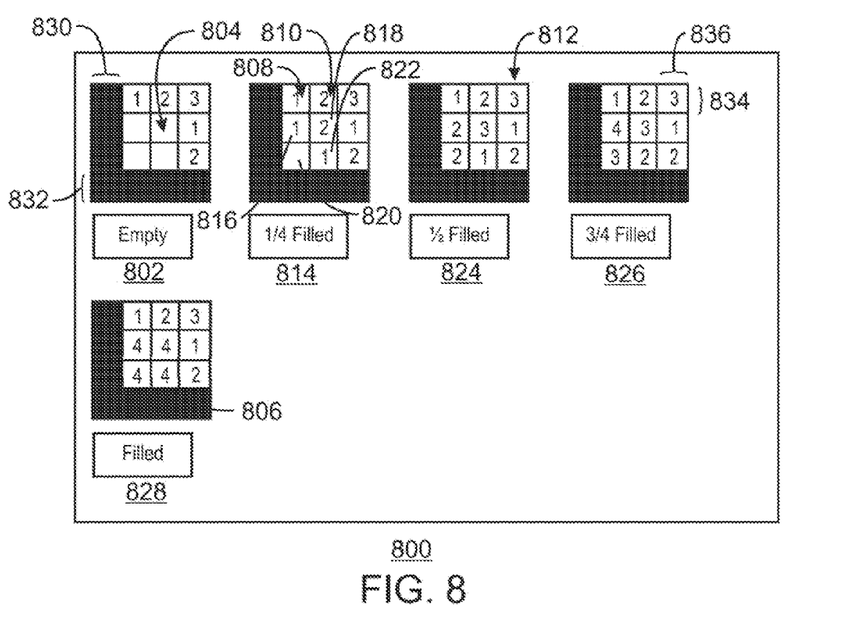
FIG. 8 is a schematic illustrating a technique that may be used to write a bitstream to an IIO using multiple levels of grayscale, in accordance with an embodiment.

FIG. 8 is a schematic illustrating a technique 800 that may be used to write a bit stream to a grayscale IIO 802 using multiple levels of grayscale, in accordance with an embodiment. In this figure, the simple grayscale discussed with respect to FIG. 6 is used. In this progressive filling of the grayscale IIO there are four different gray level states beyond white for each tile, ¼ (1 bit), ½ (2 bits), ¾ (3 bits), and 1 (4 bits), shown as a '4' or a fully black tile. That is, in progressing from a white the 804, which has no data written, to a black tile 806, to which no more data can be added, we can move to a ¼ grayscale tile 808, a ½ grayscale tile 810, a ¾ grayscale tile 812, and then a black tile 806. Although the tiles indicated include NPI tiles along the top edge, similar intensity levels, and numbers will appear in the payload section of the IIO, which is the center four tiles in this example. For simplicity of explanation in this example, a bitstream that holds four bits having a value of one is written to the grayscale IIO at each successive stage.

If the empty grayscale IIO 802 is represented as $\{0,0,0,0\}$ and the bitstream we wish to write is $\{11010101011100\dots\}$, then the bitstream can be cropped to a bitstream that contains the first four 1's, in order to overwrite only one fourth of the original 4×4 (16) bits. Therefore, the bit sequence $\{110101\}$ is written to the barcode in a sequential fashion.

This may be performed in a similar fashion to that described for the binary or 2D IIO in FIG. 5. For example, the writing may be performed by initializing both a tile counter and a bit pointer to zero. The value of the first bit in the stream is compared to the value of the first tile. If the first tile is light (zero) and the first bit is one, the value of the first tile is incremented by one level, and both counters are incremented. If the first tile is fully dark, and the bit value is one, the tile counter is incremented until a tile that is not fully dark is located, at which point, the value of the located tile is incremented by one intensity level. At that point, both counters are incremented. If the first bit is zero, the tile counter and the bit counter are both incremented without changes to tiles. The process is repeated until all of the bit sequence is used. If the tiles are completely examined, i.e., the value of the tile counter is greater than the number of tiles, the tile counter is reset to zero, and the process continues until all bits are written, Using this process, writing the bit sequence $\{110101\}$ would result in the grayscale IIO 814 shown as "¼ Filled." This may represent a starting configuration for the workflow, for example, if the initial bit sequence was considered to be entropy added to the grayscale IIO 814. In this example, using the writing sequence described above, the non-black tiles are accessed in reading order (left-to-right, top-to-bottom) so that for the first four bits in the bit sequence, i.e., $\{1101\}$, one "bit" is written to the first tile 816 and the second tile 818. The third tile 820 is not changed due to the zero bit-value at the third place in the bit stream. The intensity of the fourth tile 822 is then incremented. The tile counter is reset to zero, and the remaining two bits, {01}, in the bit stream are written over the previous tiles 816 and 818. Since a zero is in the first position, no further change is made to the first the 816, and the second tile 818 is incremented by one level.

To continue, another bit sequence of {0110101} can be overwritten onto the ¼ filled grayscale IIO 814. Following the same writing procedure as described above results in the "½ Filled" grayscale IIO 824. As noted, if a tile that is already fully black is encountered, it is skipped, and the one-value is written to the next tile in the sequence that is not fully black. The "½ Filled" grayscale IIO 824 may represent the end of the first workflow stage. At the end of the second workflow stage, another bit sequence containing four one-value bits, {100100101}, is written to get the "¾ Filled" grayscale IIO 826. It can be noted that there are still four 1's left unwritten in the "¾ Filled" grayscale IIO 826 before reaching the totally full grayscale IIO 828. As these bits would generally be used for entropy, the "¾ Filled" grayscale IIO 826 would represent the end of the workflow.

This simple example illustrates the power of the grayscale IIO. The general security of the grayscale IIO is determined by the number of transitions left to write and the number written at each stage. Writing the correct number of "bits" to each subsequent stage is very predictable and easy to implement. Further, it may be noted that the NPI along the perimeter bits include both full tiles 806, along the left edge 830 and lower edge 832 and partially filled tiles 808, 810, and 812, along the upper edge 834 and right edge 836. The differing intensities in the perimeter bits not only allow for image identification and correction, they also provide a calibration tool for the intensities in the grayscale IIO.

Figure 9:
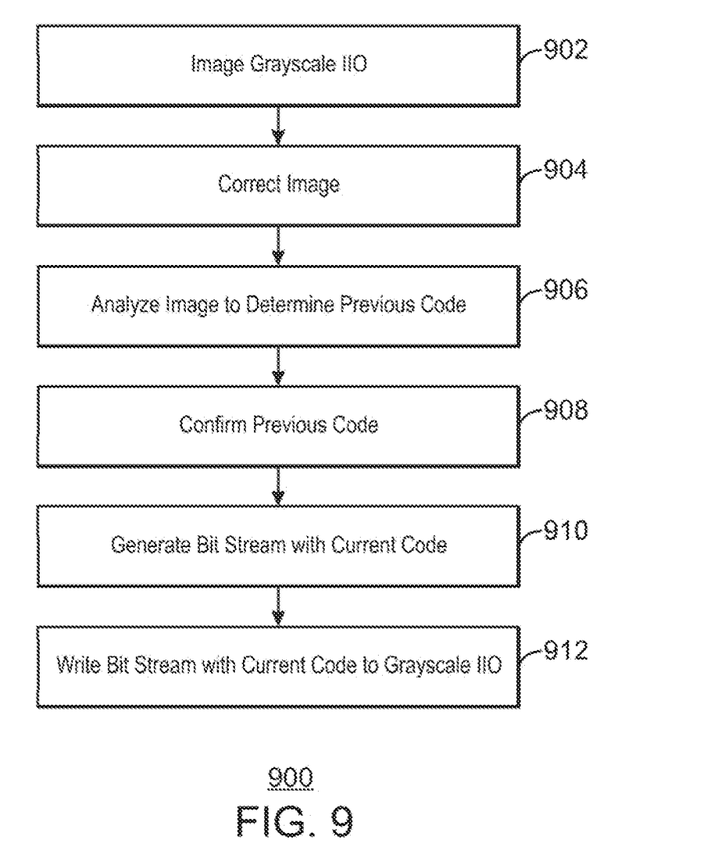
FIG. 9 is a flow diagram of a method for generating a grayscale IIO, in accordance with an embodiment.

FIG. 9 is a flow diagram of a method for generating a grayscale IIO in accordance with an embodiment. Referring also to FIG. 1 prior to configuring the system 100 and its various components to generate a grayscale IIO, the stages of the workflow can be set and a number of bits to write in total and during each state of the workflow can be selected. In some instances however, the number of bits may be dynamically determined at any stage in the workflow, for example, if additional bits need to be added for security at a stage of the workflow that takes place outside of a secure environment. In one embodiment, a grayscale IIO may be selected first and then the workflow and number of bits may be designed around the selected grayscale IIO. In another embodiment, the workflow and the number of bits may be selected, and then the grayscale IIO may be selected to fit the specifications of both the workflow and the total number of bits to be carried, for example, the grayscale IIO contains all needed tiles for every step in the workflow upon creation of the grayscale IIO.

In embodiments in which the grayscale IIO is selected after the total number of bits is identified, when selecting the grayscale IIO, the identifying object registry 104 may consider the total number of bits to be written to the grayscale IIO and whether it is desirable to include entropy in the identifying object. At this stage, other considerations may also be taken into account, such as to include non-payload indicia in the identifying object.

The probability of guessing the initial state with less than a specified statistical probability may be added prior to the initiation of the workflow by partially filling available tiles of the grayscale IIO. It can be understood that a partially completed state of the grayscale IIO has greater security (statistically) than an all-white state of the grayscale IIO. Thus, in the embodiments disclosed herein, the "entropy" can be modified by the writing of an initial bitstream, so that the number of non-white tiles is p, where $0<p<1$, the number of twice-altered tiles is roughly $p^2$, etc.

The introduction of non-payload indicia (NPI) may also affect the size of the grayscale IIO because non-payload indicia are included in tiles of the grayscale IIO that may have otherwise been written to with bits. As described above, NPI do not contain bits, but rather are used for calibration, for example, to correct skew, calibrate intensity, and calibrate orientation of the grayscale IIO, for example, at each stage in the workflow. NPI may also be used for branding, symbology identification, or the like. When it is desirable to include NPI, the number of tiles to be used for the NPI may be accounted for in the total number of tiles that are used for the grayscale IIO.

In one embodiment, the grayscale IIO, the workflow, and the number of bits are set at the identifying object registry 104. The identifying object registry 104 includes a non-transitory, computer-readable medium with a computer program for selecting the grayscale IIO, a number of stages in the workflow, a security level for each stage in the workflow, and a number of bits to be written at each stage in the workflow. The number of elements may be preselected before the workflow is initiated or dynamically determined as the workflow is in progress.

The workflow and preset number of bits may be set or defined using information received at the identifying object registry 104 from one or more participants in the workflow. For example, a product manufacturer may request that a workflow be set up for a particular product, and may provide information to define the workflow, including, for example, the distributor, the retailer, and product identification information, such as the serial number. The identifying object registry 104 may then select a suitable grayscale IIO, generate a suitable workflow, and preset payload information based upon this information. The grayscale IIO and the preset number of bits may also be set by the workflow and, thus, can be accessed (or looked up) using a number of methods.

In the embodiment described with respect to FIGS. 1-5, the workflow may involve three stages, for example, a manufacturer, a distributor, and a retailer. At each stage, the workflow may require an individual to sign a document, for example, by overprinting the grayscale IIO associated with the product, prior to shipping the product and document to the next entity, and may require an individual receiving end to sign the document upon receiving the product and document.

As described herein, the number of bits to write to the grayscale IIO at each stage of the workflow is proportional to the desired minimum level of security, on a statistical basis, at any given stage. High-level security stages may write more bits of information to the grayscale IIO, while low-level security stages may write less bits of information to the grayscale IIO. The number of bits to encode at each stage of the given workflow may be based on probability, for example, what level of confidence is needed so that the next state of the grayscale IIO has less than a p probability of being guessed. Hamming distance may also be used in the determination of the number of bits. As described herein, Hamming distance is the sum of bits, defined in the elements of the grayscale IIO that are different from one stage to the next.

Once the workflow is generated, including the various stages and the number of bits to be encoded in total and at each stage, and the grayscale IIO is selected, the workflow is initiated. The workflow instructions may be transmitted electronically to at least the first stage system 102. The instructions may include, for example, the procedural rules for the transmission of the product, the actions, or purposes associated with the product, and either the total number of bits to encode or the number of bits to encode in the product's grayscale IIO at each stage in the workflow. In one embodiment, the systems used during subsequent stages in the workflow may receive the instructions from the first stage system 102 or from a system used in previous workflow stage. In another embodiment, the systems 108 or IIO used during subsequent stages in the workflow may retrieve the instructions from the identifying object registry 104, for example, via a network 106. In another embodiment, the workflow may be initiated without transmitting the workflow instructions. For example, the document and its associated grayscale IIO may be transmitted to the first stage system 102 in the workflow. So long as the starting point of the workflow is known, the information from each stage of the workflow can be deduced.

The method starts at block 902 by imaging a grayscale IIO. The imaging may be performed by a bar code reader 130, a software object, a scanner, a camera, or any other suitable imaging device or code. The grayscale IIO is isolated or segmented from the surrounding content, for example, by the use of non-payload indicia (NPI) that delineate the edges of the grayscale IIO. At block 904, an image correction and calibration is performed. Calibration may involve orienting the grayscale IIO using the non-payload indicia, dewarping the grayscale IIO, deskewing the grayscale IIO, calibrating the possible intensity levels, and the like. The calibration may be performed in conjunction with interpretation of the grayscale IIO, or calibration may be performed and then interpretation of the grayscale IIO may be performed.

At block 906, the image may be analyzed to determine the previous grayscale code. This may be performed, for example, by incrementally determining the bits written to the tiles to generate a bitstream. For example, the bitstream may be determined by reversing a procedure used to write the bits, such as the procedure discussed with respect to FIG. 8. The bitstream may then be decoded, for example, using a public key to decode a bitstream encoded with a corresponding private key. Any number of techniques may be used to encode and decode the data between workflow stages, including the private/public key system, generation of an encoded numerical hash of the code, and the like. Further, in some embodiments, an identifying object registry 104 may be used to confirm the bitstream without further decoding, for example, if the grayscale IIO effectively stored a secret string, nonce, or the like.

At block 908, the previous code may be confirmed to validate the identity of the document and the previous stage. This may be performed by querying the identifying object registry 104 with the bitstream. In some embodiments, the confirmation may be performed by comparing the decoded value to an expected value at a local stage system. Once the confirmation has been performed, at block 910 a new bitstream may be generated with a current code, for example, related to the current work stage. The new bitstream may be an encrypted version of a hash, for example, generated using a private key. In some embodiments, a new bitstream may be obtained from an identifying object registry 104.

At block 912, the new bitstream may be written over the current grayscale IIO. The stage system 102, 108, or 110 performing the incremental writing may determine the location of remaining available candidate areas that can be written to, for example, tiles that are not already carrying NPI or are full. A variety of algorithms may be used to determine where to place the information, which may include a preset number of bits. Non-limiting examples of these algorithms include scrambling, random/nonce, one-time-pad, encryption, data replication, etc. These techniques identify where the information can be added to the grayscale IIO. This may include identifying open tiles for data and writing the bitstream to the open tiles.

In one embodiment after the available candidate areas in the grayscale IIO are identified, the first stage system 102 identifies or retrieves the preset number of bits, for example, from the workflow instructions, to be written. In some embodiments, the number of bits to be written at a particular stage may be determined automatically by the stage system 102, 108, or 110 performing the incremental writing or by a user. In these embodiments, the total number of bits to be encoded throughout the workflow is known, and the stage system 102, 108, or 110 at each workflow stage would add a suitable amount of information to the grayscale IIO. For example, a string containing 0's and then 1's incrementally to be written could be stored as a nonce and then the 1's would be incrementally written to the grayscale IIO stage by stage.

When determining how to write the information, the stage system 102, 108, or 110 will use the information from segmentation to identify the then-current intensity levels of the available candidate areas in the grayscale IIO. When determining how to write the information, the stage system 102, 108, or 110 will select a scrambling technique by identifying an algorithm to be used for incorporating the information for the current workflow stage. This algorithm may be random or nonce-based, or may be deterministic.

In instances where the workflow 200 is based on the identifying object registry 104, as discussed with respect to FIG. 2, the previous state of the grayscale IIO may be replicated using the network 106, so that random or nonce methods are valid when inputting new information. For example, the information to be added is provided by a random number generator and is stored in the identifying object registry 104. In this example, the newly added bits are randomly added, and the identifying object registry 104 can provide and store the random new bits.

In instances where the independent incremental workflow 300 is used, as discussed with respect to FIG. 3, each workflow stage may use an intelligent hash of the previous state of the grayscale IIO. In this example, a deterministic approach may be used, in which the newly written information is determined from the current state of the grayscale IIO and any additional pre-populated information that distinguishes the grayscale IIO from other IIOs on the product, such as SKU specific information and mass serialization information. In one embodiment, a grayscale IIO may be pre-populated with the SKU specific information and mass serialization information to ensure each grayscale IIO is unique. In another embodiment, if a document has other unique information, such as a routing number or another barcode/stock identifier for point of sale, the other unique information can be included in a digital signature, such as the output of an operation on a binary string using a private key, to create the next set of bits to write to the grayscale IIO.

When determining how to write the information, the stage system 102, 108, or 110 will also select a manner in which the state change results in a predictable change in the grayscale IIO. In one embodiment, this may be accomplished when a binary string representation of the current state of the grayscale IIO is transformed with a security string, for example, by using a private key to encrypt a binary string. When determining how to write the information, the stage system 102, 108, or 110 will also identify a writing scheme, for example, as described above with respect to FIG. 8, which may be suitable for the then-current stage of the workflow.

The stage system 102, 108, or 110 performing the incremental writing at workflow stage I then writes the information to the grayscale IIO to form a new grayscale IIO. When writing, the stage system 102, 108, or 110 may use the incremental intensity process, the selected scrambling technique, the selected manner for achieving a predictable state change, and the selected writing scheme to write the information to the grayscale IIO. During each writing stage in the workflow, previously written information is not generally removed or changed, but rather the additional information is added, changing the state of the grayscale IIO.

While the number of bits to be written is preset in one embodiment, the actually writing of the information may take place dynamically as the workflow progresses. As such the candidate areas that are actually written to are determined in real time according to, in part, the areas available for writing, the number of bits to be written and the algorithms to be used.

The product and the grayscale IIO, such as a document, can be printed and stored. When the grayscale IIO is completely physical, the document with the grayscale IIO printed thereon as it was received can be overprinted so that the newly written to areas will be filled in the printed version. When the grayscale IIO is physical and electronic, the electronic version of the document and the incrementally written to grayscale IIO can be reprinted or overprinted, if desired. When the incrementally written to grayscale IIO is saved, at it will replace any prior versions of the grayscale IIO.

The product and incrementally written to grayscale IIO are then shipped, electronically or physically, to the next entity in the workflow, such as workflow stage II system 108, as described with respect to FIG. 1. Similarly, when the action, task, etc. set forth in the workflow stage II instructions have been performed, the grayscale IIO is incrementally written to according to the workflow stage II instructions, for example, following the same method 900. The document and its incrementally-overwritten grayscale IIO can then be printed and stored by the workflow stage IIO system 110, which adds its increment to the grayscale IIO.

At each stage, the previous states of the grayscale IIO are still provable because there are no new available candidate areas in the later stages of the grayscale IIO. In embodiments where the stage system 102, 108, or 110 at each stage in the workflow have access to all the rules governing writing at, the previous stages, these stage system 102, 108, or 110 can automatically check all previous states of the grayscale IIO for validity when checking the then-current state.

In any of the embodiments disclosed herein, if multiple identifying objects are part of the same shipment, it may be desirable to have the same pre-filled set of data bits. Embodiments of the grayscale IIOs disclosed herein retain the set real estate on a document even through information is incrementally written thereto throughout a workflow. The state of the grayscale IIO and the then-current stage of the workflow may be determined directly from the intensity of the tiles and the percentage of the tiles that are filled in or saturated, even without knowing how to interpret the data embedded therein.

Figure 10:
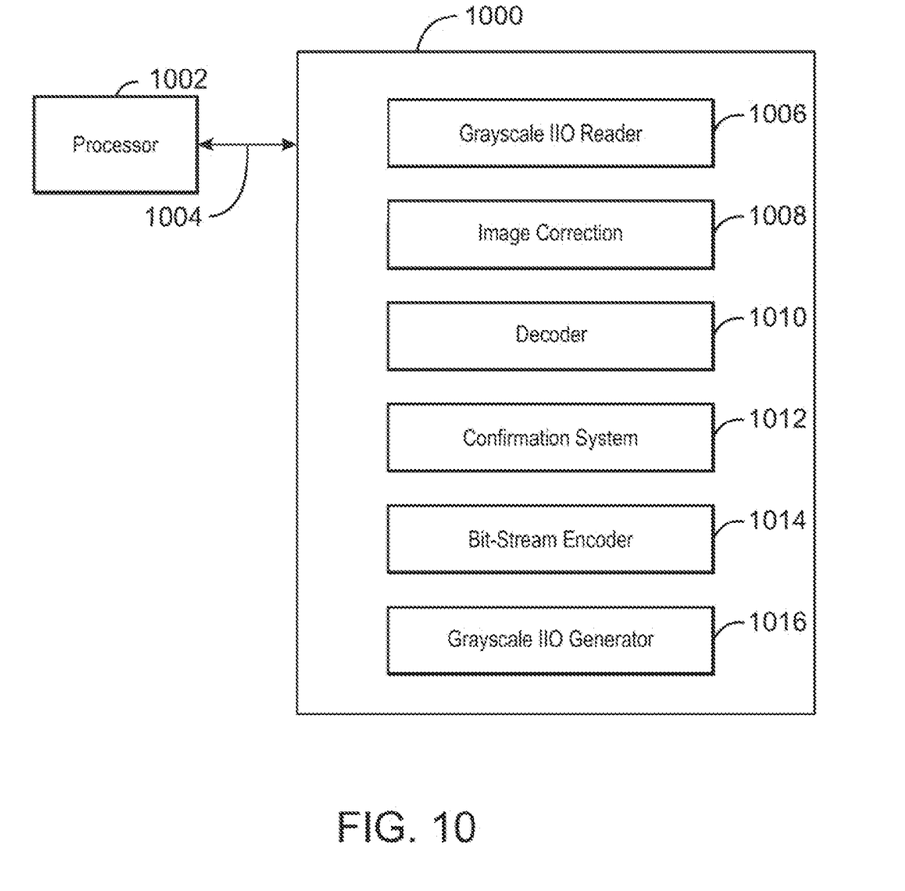
FIG. 10 is a block diagram of a non-transitory, computer readable medium containing code for confirming a product in a workflow using an IIO having a multi-level grayscale in accordance with an embodiment.

FIG. 10 is a block diagram of a non-transitory, computer readable medium 1000 containing code for confirming a workflow using an IIO having a grayscale in accordance with an embodiment. A processor 1002 may access the non-transitory, computer readable medium 1000 over a bus 1004, or other communication system, to obtain code configured to direct the processor 1002 to confirm a product based on a grayscale IIO associated with the product. The non-transitory, computer readable medium 1000 may include any combination of read only memory (ROM), random access memory (RAM), hard drives, optical drives, RAM drives, or flash drives.

The non-transitory, computer readable medium 1000 may include a module 1008 to read a grayscale IIO and a second module 1008 to correct the image and calibrate the reader. A third module 1010 may decode the grayscale IIO to generate a first bit stream. A fourth module 1012 may authenticate the code, for example, by following the instructions that should have resulted in the current grayscale IIO or by accessing an identifying object registry. A fifth module 1014 may encode a current identifying bitstream. A sixth module 1016 may then identify open tiles in the grayscale IIO and overwrite the bitstream onto the grayscale IIO.

What is claimed is:

1. A system for generating a grayscale incremental information object (IIO), comprising:
   a processor; and
   a memory, wherein the memory comprises computer readable code configured to direct the processor to:
   analyze a grayscale IIO on the product to identify a first code, wherein the grayscale IIO comprises a plurality of tiles, and wherein a tile represents encoded data by differing levels of intensity; and
   confirm the first code, and, if the first code is confirmed:
   generate a second code comprising a bitstream; and
   overwrite the bitstream onto the grayscale IIO, wherein the grayscale IIO is a same size after the processor is to overwrite the bitstream as before the overwrite of the bitstream.

2. The system of claim 1, comprising a device configured to overprint the bitstream onto a grayscale IIO physically located on the product.

3. The system of claim 1, comprising a handheld device, a mobile device, or a bar code reader configured to read a grayscale IIO.

4. The system as defined in claim 1, wherein the memory comprises computer readable code for setting entropy in the grayscale IIO at a start of a workflow.

5. The system as defined in claim 1, wherein the memory comprises computer readable code for updating writing schemes at each stage in a workflow to reflect a distribution of intensities of tiles in the grayscale IIO.

6. The system as defined in claim 1, wherein the memory comprises computer readable code for setting a Hamming distance between states of the grayscale IIO.

7. The system as defined in claim 1, wherein the memory comprises computer readable code for setting non-payload indicia (NPI) in the grayscale IIO.

8. The system as defined in claim 1, wherein the memory comprises computer readable code configured to direct the processor to:
   identify an intensity of a tile in the grayscale IIO; and
   write a bit value of one to the tile based upon the intensity, wherein, if the tile is not at full intensity, the intensity of the tile is incremented.

9. The system as defined in claim 1, further comprising computer readable code for determining a number of bits to be input to the grayscale IIO at each step in a workflow to meet statistical targets.

10. A method for generating a grayscale progressive information object (IIO), comprising:
    analyzing a grayscale IIO to determine a first code, wherein the grayscale IIO comprises a plurality of tiles, and the intensity of a tile corresponds to the number of data bits written to the tile;
    confirming the product from the first code, and, if the product is confirmed:
    generating a new code comprising a bitstream; and overwriting the bitstream on the grayscale IIO, wherein the grayscale IIO is a same size after writing of the bitstream as before the writing of the bitstream.

11. The method of claim 10, wherein confirming the product comprises analyzing the first code using a public key provided from a previous stage in a workflow.

12. The method of claim 10, wherein the grayscale IIO is an electronic IIO, a mixed electronic and physical IIO, or a physical IIO.

13. The method of claim 10, comprising writing an initial bitstream to the plurality of tiles to introduce entropy into the grayscale IIO.

14. The method of claim 10, wherein overwriting the bitstream on the grayscale IIO comprises:
  locating an available tile, wherein an available tile has an intensity that is less than completely black; and
  incrementing the intensity of the available tile to encode a bit value of 1.

* * * * *